United States Patent [19]

Okamura et al.

[11] 3,984,495

[45] Oct. 5, 1976

[54] SHAPED PRODUCTS SUCH AS FIBERS AND FILMS COMPOSED MAINLY OF POLYVINYL CHLORIDE AND POLYVINYL ALCOHOL, AND FURTHER CONTAINING AN AMIDO-CONTAINING POLYMER, AND METHODS FOR PRODUCTION THEREOF

[75] Inventors: Seizo Okamura, Kyoto; Tomoaki Tagawa, Funabashi; Kazuo Yagami, Yatsushiro; Kazuto Matsuo, Yatsushiro; Mitsuo Sakabe, Yatsushiro; Tsutomu Sogo, Yatsushiro, all of Japan; Mikio Korematsu, deceased, late of Fukuoka, Japan, by Etsuko Korematsu, widow and legal successor

[73] Assignee: Kohjin Co., Ltd., Tokyo, Japan

[22] Filed: Sept. 20, 1974

[21] Appl. No.: 507,871

Related U.S. Application Data

[60] Division of Ser. No. 348,069, April 5, 1973, Pat. No. 3,887,676, which is a continuation-in-part of Ser. No. 230,478, Feb. 29, 1972, abandoned, which is a continuation of Ser. No. 821,066, May 1, 1969, abandoned.

[30] Foreign Application Priority Data

| May 7, 1968 | Japan | 43-30471 |
| May 7, 1968 | Japan | 43-30472 |
| Sept. 16, 1968 | Japan | 43-66794 |
| Apr. 15, 1969 | Japan | 44-29264 |

[52] U.S. Cl. ............................ 260/876 R; 260/884; 264/184; 264/185
[51] Int. Cl.$^2$ ........................................ C08L 51/06
[58] Field of Search ..................... 260/876 R; 884

[56] References Cited
UNITED STATES PATENTS

| 2,843,562 | 7/1958 | Caldwell | 260/29.6 UA |
| 2,879,256 | 3/1959 | Wooten, Jr. et al. | 260/884 |
| 2,895,786 | 7/1959 | Schlack | 260/899 |
| 3,111,370 | 11/1963 | Okamura et al. | 260/29.6 UA |
| 3,518,326 | 6/1970 | Forsberg | 260/828 |

*Primary Examiner*—J. Ziegler
*Attorney, Agent, or Firm*—Toren, McGeady and Stanger

[57] ABSTRACT

New polymeric materials in the form of fibers and films composed of polyvinyl alcohol, polyvinyl chloride and a water-soluble amido-polymer having a portion of the polyvinyl chloride grafted thereon and which contains at least about 80 mole percent amido or methylolated amido groups. These materials possess excellent light and heat resistance.

Also disclosed is a process for preparing these materials comprising adding a water-soluble catalyst and emulsifier to an aqueous solution of the amido-polymer and subjecting the mixture to emulsion polymerization with added vinyl chloride. Thereafter, polyvinyl alcohol is added as a matrix to the emulsion to make a dope which is then coagulated.

3 Claims, No Drawings

SHAPED PRODUCTS SUCH AS FIBERS AND FILMS COMPOSED MAINLY OF POLYVINYL CHLORIDE AND POLYVINYL ALCOHOL, AND FURTHER CONTAINING AN AMIDO-CONTAINING POLYMER, AND METHODS FOR PRODUCTION THEREOF

CROSS REFERENCE TO RELATED APPLICATIONS

This application is a division of application Ser. No. 348,069, filed Apr. 5, 1973, now U.S. Pat. No. 3,887,676, which in turn was a continuation-in-part of application Ser. No. 230,478, filed on Feb. 29, 1972, and now abandoned, which in turn was a continuation of application Ser. No. 821,066, filed on May 1, 1969 and now abandoned.

BACKGROUND OF THE INVENTION

1. Field of the Invention

This invention relates to novel spun emulsion fibers and other structures containing polyvinyl chloride (hereinafter abbreviated as PVC) and polyvinyl alcohol (hereinafter abbreviated as PVA) as the main constituents and further containing amido-containing polymers, and methods for production thereof.

2. Description of the Prior Art

A process for producing fibers composed of PVC and PVA by the emulsion-spinning method is already known and is disclosed in U.S. Pat. No. 3,111,370 (patented Nov. 19, 1963). The main character of the process resides in preparing a stable spinning dope by mixing an emulsion of PVC having a viscosity of less than 200cp. and a particle size of smaller than 500A, in which a part of the PVC is grafted onto the PVA, with PVA as a matrix (which is a water-soluble high molecular weight compound or high polymer capable of aiding the coagulation of the emulsion into a fiber at the coagulating operation).

SUMMARY OF THE INVENTION

We have found that an emulsion of PVC containing a novel constituent prepared by grafting vinyl chloride onto a special amido-containing water-soluble polymer, will very favorably mix with a matrix consisting mainly of PVA to give a stable dope. We have further found that new fibers and other structures possessing excellent light resistance and high heat resistance, which would not be expected from any conventional process, can be obtained from said dope by spinning or film-making.

The present invention concerns new fibers or structures such as films composed mainly of PVC and PVA and further containing an amido-containing polymer, and methods for production thereof. Particularly, the method of the present invention comprises adding a water-soluble catalyst and emulsifier to an aqueous solution containing one or more compounds selected from the group consisting of polyacrylamide (hereinafter abbreviated as PAM), methylolated polyacrylamide (hereinafter abbreviated as M-PAM), water-soluble PAM copolymers (hereinafter abbreviated as PAM-copolymers) and water-soluble M-PAM copolymers (hereinafter abbreviated as M-PAM copolymers), subjecting the mixture to emulsion polymerization with the addition of vinyl chloride to make an emulsion of PVC, whereby a part of the vinyl chloride is grafted onto the polymer present in said aqueous solution, and thereafter adding PVA as a matrix into the emulsion to make a dope which is then dehydrated and coagulated.

DESCRIPTION OF THE PREFERRED EMBODIMENTS

Processes for producing a fiber by emulsionspinning method using PVC and PVA as components, or processes for producing a fiber from a dope prepared by polymerizing vinyl chloride in the presence of a copolymer composed mainly of PVA containing less than 50 mol% of amido groups are known. However, the preparation of the dope of the present invention is based on a novel process wherein a water-soluble backbone amido-polymer (which is a body on which the grafting-on polymerization is made) containing at least 80 mol% of amido groups and/or methylolated amido groups is used to make a polymer emulsion containing PVC as a main constituent and a graft polymer (the lateral chains of which are composed of vinyl chloride), into which PVA as a matrix is then added in an amount of 40 to 150% based on the PVC including the graft one, i.e., the total amount of PVC.

We have discovered that when vinyl chloride is subjected to the emulsion polymerization in an aqueous solution of a special water-soluble amido-polymer, an emulsion can be obtained of which the stability is at least as good as that of an emulsion prepared by the conventional process (disclosed, for example, in U.S. Pat. No. 3,111,370) in which vinyl chloride is subjected to the emulsion polymerization in an aqueous solution of PVA common with the constituent of the matrix. We have further found that when a backbone amidopolymer on which at least a part of the PVC is grafted is present in the product obtained from the process of the present invention, the product possesses greatly improved light resistance and heat resistance, as compared with the structures obtained by conventional processes (for example, U.S. Pat. No. 3,111,370). Usually, the present of PVC in products obtained by the conventional process substantially decreases the degree of each of these desirable properties.

Additionally, the fibers obtained by the inventive process possess better mechanical properties and hot water resistance obtained by acetalization than the fibers produced by the conventional process.

The water-soluble backbone amido-polymers containing at least 80 mol% of amido groups and/or methylolated amido groups which are usable in the inventive process are PAM, M-PAM and copolymers thereof.

PAM can be produced by polymerization from an aqueous solution of acrylamide, and M-PAM can be produced by polymerization from an aqueous solution of methylolated acrylamide or by methylolation of PAM with formaldehyde.

PAM-copolymers can be produced by copolymerizing acrylamide with one or more polymerizable monomers selected from the group consisting of acrylic acid, methacrylic acid, allylsulfonic acid, methallylsulfonic acid, styrenesulfonic acid, vinylsulfonic acid and their salts and acrylamide derivatives such as methacrylamide methylolated acrylamide, methylolated methacrylamide, diacetone acrylamide, N-isopropyl acrylamide, N-tert-amylacrylamide and N,N-dimethylacrylamide under heating below 100° C in their aqueous solution containing water-soluble catalyst, or introducing amido group into the polymer, by partially modifying polymers having nitrile group by hydrolysis under heating 1 − 30% suspension of polyacrylonitrile in the presence of 1 – 30% acidic or alkaline reagent per solid polymer, or by grafting acrylamide onto water-soluble polymers.

Typically, the salts of the foregoing described polymerizable acids are the alkali metal salts, e.g., sodium allylsulfonate, sodium methallylsulfonate and sodium styrenesulfonate.

M-PAM-copolymers can be produced using methylolated acrylamide in the same manner as in the case of the above mentioned PAM-copolymers, and can also be produced by the methylolation of PAM-copolymers with formaldehyde.

Mixtures of two or more of said polymers may be used. Also, other water-soluble polymers can be added, such as, hydroxyethyl cellulose, methylcellulose, PVA, etc., as a viscosity-controlling agent.

It is desirable that the particle sizes of the inventive emulsion consisting mainly of PVC produced by subjecting vinyl chloride to emulsion polymerization in the presence of the above-mentioned water-soluble backbond amido-polymer may be as fine as possible. In order to carry out the emulsion polymerization reaction smoothly and make a stable emulsion with fine particles, it is desirable that the content of the water-soluble backbone amido-polymer is less than 20% based on the PVC.

In the emulsion polymerization of vinyl chloride potassium persulfate or ammonium persulfate singly or redox catalyst, for example, compound above-mentioned used together with reducing agent such as sodium bisulfite is generally used as the water-soluble catalyst. And as the emulsifier, anionic surface active agent such as sodium laurylsulfate, sodium dodecylbenzenesulfonate is used effectively, and further nonionic surface active agent may safely be used together with them.

In preparing the matrix, PVA may be used singly, but other water-soluble matrix polymers may be mixed with it. As for the usable water-soluble matrix polymers, they are natural high molecular weight compounds or high polymers, such as, protein, hydroxy cellulose, methyl cellulose, their derivatives, and synthetic polymers, such as, PAM, M-PAM, PAM-copolymers, and M-PAM-copolymers. It is necessary that the amounts of these materials which are added should be equal to or less than that of the PVA, and preferably, less than 40% by weight based on the weight of the PVA to insure the complete continuity of the emulsion particles.

If a desirable result is to be effected, the amount of the water-soluble matrix polymer consisting mainly of PVA to be added as a matrix should be in a range between 40 and 150% by weight based on the weight of the PVC including the grafted PVC contained in said emulsion consisting mainly of PVC. When the amount of the matrix increases beyond this range, the continuity of the emulsion particles results in incompleteness. When the amount of the matrix decreases below this range, the effect of the matrix becomes incomplete. In both cases, the resulting products do not possess the desired properties.

To determine the continuity of the emulsion, the fiber or film is placed on a deck glass, one or two drops of 80 – 90% formic acid are poured thereon, and the glass is placed on a metal plate heated to 60°– 80° C. Then, by slightly pressing down on the film or fiber with a glass bar, the matrix constituents are dissolved and observed by a microscope. In case of complete continuity of the emulsion particles, a network of fibril can be observed, whereas in case of discontinuity granular or elongated emulsion particles remain.

The resulting graft polymer is insoluble in both hot water and tetrahydrofuran. It can be isolated from the emulsion by coagulating the emulsion to separate a solid matter which is then extracted with hot water, dried, and extracted again with tetrahydrofuran.

The graft efficiency obtained with the present process, defined as Graft efficiency = graft polymer/(PVC homopolymer + graft polymer), varies with the type and concentration of the backbone polymers. Usually, the graft efficiency is in the range from about 2 – 50%.

The emulsion produced on the basis of the process of the invention is so stable that it can be stored for a long period. Moreover, it has a good miscibility with a matrix polymer, which in the present case consists mainly of PVA. Dopes prepared by adding the matrix to the emulsion are also very stable.

Structures obtained by extruding the dope into an aqueous solution of sodium sulfate, followed by a wet-heat treatment, washing with water, drying, stretching, heat treatment and acetalization do almost never change coloration under heating. Additionally, the color change due to irradiation with light is slight. The products are superior in these, as well as other mechanical properties, as compared with the control test products containing no amido and/or methylolated amido groups.

In order to further improve the water resistance, the moulded structures of the present invention may be subjected to acetalization with an aldehyde, such as, formaldehyde, acetaldehyde and benzaldehyde in an aqueous solution containing sulfuric acid and sodium sulfate. Such products possess superior water resistance as compared to those obtained by the conventional process when tested under the same conditions.

The present invention will be further explained in detail by the following examples:

EXAMPLE 1

A mixture of 80 parts of salt-free water, 0.1 part of potassium persulfate, 0.06 parts of sodium bisulfite and 20 parts of acrylamide was subjected to polymerization for 120 minutes at temperatures not higher than 85° C to obtain an aqueous polyacrylamide (hereinafter abbreviated as PAM) solution having a viscosity of 150 centipoise (hereinafter abbreviated as cp.) at 25° C. To 8.5 parts of this aqueous PAM solution, 61 parts of salt-free water, 0.04 part of potassium persulfate and 1.33 part of an emulsifier (sodium laurylsulfate) were added to make a homogeneous mixture. This mixture was charged to an autoclave and 28.8 parts of vinyl chloride were added. The mixture was polymerized for 6 hours at 45° C to obtain an emulsion containing 30% of PVC inclusive of the graft PVC.

The emulsion had a viscosity of 25 cp. at 20° C and a pH of 4.0. The average particle diameter was 320A as determined by observation through an electron microscope. The graft efficiency was 16%. The emulsion was so stable that it could be stored for a long time without any change in the viscosity, particle diameter and other properties except that a slight decrease in pH value was observed.

A dope was prepared by adding 60 parts of a 15% aqueous solution of PVA as a matrix to 32 parts of the emulsion, and the mixture was kept at 80° C to remove bubbles. The dope which was stable for a long period was filtered and extruded at 45° C into 350 g/liter of an aqueous sodium sulfate solution to spin a yarn, which was then allowed to pass through 300 g/liter of a sodium sulfate bath heated at 90° C. The wet-heat treated yarn was washed with water, dried and stretched at 150° C in a stretching ratio of 2.5, and then treated under heating at 230° C for one minute.

The yarn thus obtained was acetalized by treating it at 70° C for 30 minutes in a bath comprising 2.5 parts of formaldehyde, 15 parts of sulfuric acid, 10 parts of sodium sulfate and 72.5 parts of water. The properties of the 2 denier fiber thus obtained are shown in Table 1 in comparison with those of a control fiber which was prepared by the same process except that the same amount of an aqueous PVA solution having the same concentration as that of the aqueous PAM solution was used instead of the aqueous PAM solution.

Table 1

| Heat resistance [1] | | | Inventive Fiber | Control Fiber |
|---|---|---|---|---|
| Whiteness | Degree of color | 0 min. | 88 | 87 |
| | change (%) | 60 min. | 50 | 20 |
| Yarn | Strength | 0 min. | 2.95 | 2.86 |
| Property | (g/d) | 60 min. | 2.94 | 2.57 |
| | Elongation | 0 min. | 24.2 | 21.6 |
| | (%) | 60 min. | 24.2 | 20.6 |

| Light resistance [2] | | | Inventive Fiber | Control Fiber |
|---|---|---|---|---|
| Whiteness | Degree of color | 0 hr. | 88 | 87 |
| | change (%) | 100 hrs. | 88 | 80 |
| Yarn | Strength | 0 hr. | 2.95 | 2.86 |
| Property | (g/d) | 100 hrs. | 2.51 | 1.71 |
| | Elongation | 0 hr. | 24.4 | 21.6 |
| | (%) | 100 hrs. | 21.0 | 13.2 |

| Mechanical properties: | Inventive Fiber | Control Fiber |
|---|---|---|
| Cross section of fiber | A round shape with rough surface | Cocoon type |
| Shrinkage in boiling water (%) | 4.3 | 35.4 |
| Dry strength (g/d) | 2.95 | 2.86 |
| Dry elongation (%) | 24.4 | 21.6 |
| Knot strength (g/d) | 1.30 | 1.25 |

Note:
[1] The yarn was allowed to stand for 60 min. in a gear oven heated at 150°C. The test condition of the following examples was the same as above.
[2] Irradiation was made for 100 hours by means of a Xenon fade mater. Tests were conducted according to JIS L1015 (JIS is the abbreviation of Japanese Industrial Standards, and the method for measurement of Light Resistance based on JIS L-1015 corresponds to that according to AATCC 16E-1964).

EXAMPLE 2

A mixture comprising 80 parts of salt-free water, 0.075 part of ammonium persulfate, 12.3 parts of acrylamide, 1.36 parts of diacetone acrylamide, 1.36 parts of sodium methallylsulfonate and 2 parts of carboxymethyl cellulose as a viscosity-controlling agent was polymerized for 120 minutes at temperatures not higher than 90° C to obtain an aqueous copolymer solution containing PAM as a main constituent having a viscosity of 35 cp. at 25° C.

To 9.5 parts of the aqueous copolymer solution, 60 parts of salt-free water, 0.04 part of ammonium persulfate, and 1.33 parts of an emulsifier (sodium dodecylbenzenesulfonate) were added to prepare a homogeneous mixture. This mixture was charged to an autoclave and then 28.8 parts of vinyl chloride were mixed in. The mixture was polymerized at 45° C for 7 hours to obtain an emulsion containing 30% of PVC including the graft protion.

The emulsion had a viscosity of 18 cp. at 20° C and a pH of 6.5. The average particle diameter was 350A as observed through an electron microscope and the graft efficiency was 14%. The emulsion was sufficiently stable so that it could be stored for a long period without any change in the pH value, viscosity, particle diameter and other properties. A 2 denier fiber was prepared from the emulsion in the same manner as in Example 1. The properties of the fiber obtained after the acetalization were as follows:

Table 2

| Heat resistance | | | |
|---|---|---|---|
| Whiteness | Degree of color | 0 min. | 91 |
| | change (%) | 60 min. | 54 |
| Yarn | Strength | 0 min. | 3.15 |
| Property | (g/d) | 60 min. | 3.12 |
| | Elongation | 0 min. | 26.4 |
| | (%) | 60 min. | 26.3 |
| Light resistance | | | |
| Whiteness | Degree of color | 0 hr. | 91 |
| | change (%) | 100 hrs. | 90 |
| Yarn | Strength | 0 hr. | 3.15 |
| Property | (g/d) | 100 hrs. | 2.84 |
| | Elongation | 0 hr. | 26.4 |
| | (%) | 100 hrs. | 24.6 |

| Mechanical properties | |
|---|---|
| Cross section of fiber | A round shape with a rough surface |
| Shrinkage in boiling water (%) | 5.5 |
| Dry strength (g/d) | 3.15 |
| Dry elongation (%) | 26.4 |
| Knot strength (g/d) | 1.33 |

EXAMPLE 3

An emulsion of PVC was prepared by the same manner as in Example 1 except that 30 parts of a 15% aqueous solution of M-PAM (200cp. at 25° C) was used instead of the PAM aqueous solution of Example 1. The emulsion, containing 27% of PVC (including the graft constituent) which was obtained after the polymerization had been carried out for 12 hours, had a viscosity of 45 cp. at 25° C.

The graft efficiency was 23%. The emulsion containing the graft constituent could be stably stored for a long time as in Example 1. PVA was added to the emulsion in a sufficient amount to make the ratio of PVC (including the graft constituent) : PVA = 55 : 45. The dope was stored for 3 days to test the stability and nothing unusual was observed during this period. Using this dope, a fiber was prepared in the same manner as in Example 1. The obtained 2 denier fiber had the excellent properties shown below.

Table 3

| | | | | |
|---|---|---|---|---|
| | | Whiteness | Degree of color | 0 min. | 89 |
| | | | change (%) | 60 min. | 56 |
| Heat | | | Strength (g/d) | 0 min. | 2.55 |
| resis- | Yarn | | | 60 min. | 2.53 |
| tance | property | | Elongation (%) | 0 min. | 23.2 |
| | | | | 60 min. | 23.0 |
| | | Whiteness | Degree of color | 0 hr. | 89 |
| Light | | | change (%) | 100 hrs. | 88 |
| resis- | Yarn | | Strength (g/d) | 0 hr. | 2.55 |
| | | | | 100 hrs. | 2.36 |
| tance | property | | Elongation (%) | 0 hr. | 23.2 |
| | | | | 100 hrs. | 21.7 |

| Shrinkage in boiling water (%) | 1.34 |
|---|---|
| Knot strength (g/d) | 3.5 |

EXAMPLE 4

Two mixtures were prepared, each of which comprised 80 parts of salt-free water, 0.1 parts of potassium persulfate, 0.05 part of sodium bisulfite 20 parts of methylolated acrylamide and sodium allylsulfonate, their methylolated acrylamide contents being respectively 80 and 95 mol% based on the total of the two compounds. The polymerization was carried out at temperatures not higher than 80° C for 3 hours. The obtained aqueous copolymer solutions (8.5 parts) were treated in the same manner as in Example 1 to obtain emulsions containing PVC as a main constituent, from which 5 denier fibers were produced by the same manner as in Example 1. The acetalized fibers whose methylolated acrylamide contents differed from each other possessed better heat resistance and light resistance, and lower shrinkage percentages in boiling water than a control fiber prepared by using PVA instead of said copolymer. The comparisons of these properties are shown in Table 4.

Table 4

| Copolymerization ratio of *<br>methylolated acrylamide(mol%) | | | | Control<br>(0) | 80 | 95 |
|---|---|---|---|---|---|---|
| Heat<br>Resistance | Whiteness | Degree of<br>color | 0 min. | 85 | 88 | 90 |
| | | change (%) | 60 min. | 15 | 57 | 60 |
| | Yarn<br>pro-<br>perty | Strength<br>(g/d) | 0 min. | 2.40 | 2.53 | 2.56 |
| | | | 60 min. | 2.15 | 2.50 | 2.52 |
| | | Elonga-<br>tion(%) | 0 min. | 22.5 | 23.5 | 23.4 |
| | | | 60 min. | 21.5 | 23.2 | 23.3 |
| Light<br>Resistance | Whiteness | Degree of<br>color | 0 hr. | 85 | 88 | 90 |
| | | change (%) | 100 hrs. | 75 | 88 | 89 |
| | Yarn<br>pro-<br>perty | Strength<br>(g/d) | 0 hr. | 2.40 | 2.53 | 2.56 |
| | | | 100 hrs. | 1.43 | 2.11 | 2.25 |
| | | Elonga-<br>tion (%) | 0 hr. | 22.5 | 23.5 | 23.4 |
| | | | 100 hrs. | 13.7 | 22.8 | 22.9 |
| Shrinkage in boiling water(%) | | | | 34.5 | 5.3 | 5.0 |

Note:
* The copolymerization ratio of methylolated acrylamide is the ratio of the compound to the total monomers charged at the polymerization.

EXAMPLE 5

The dope of Example 1 was extruded through a slit with 0.2mm width into 350g/liter of an aqueous sodium sulfate solution to make a film, which was then allowed to pass through a series of saturated aqueous sodium sulfate solutions whose temperatures were increased one after another from 70° to 90°C. The film, after being passed through an aqueous sodium sulfate (100g/liter) bath at 30°C, was cooled and washed with cold water. It was then stretched in one of its dimensions by an amount of 100% while being dried at 100° – 160°C. The film thus obtained was transparent and showed excellent resistance to heat discoloration and light.

EXAMPLE 6

A yarn was spun from the dope of Example 2 in the same manner as in Example 1 and subjected to wet heat treatment, washed with water, dried, stretched at a ratio of 2 at 160°C and cut. The surfaces of the obtained fiber when wetted with water and heated rapidly softened and possessed self-adhesion.

What is claimed is:

1. A polymeric composition consisting essentially of polyvinyl alcohol, polyvinyl chloride and a water-soluble amideterpolymer consisting essentially of acrylamide, diacetone acrylamide and sodium methallyl sulfonate, a part of the polyvinyl chloride being grafted on to the water-soluble amide-terpolymer, said water-soluble amide-terpolymer containing at least 80 mole % amido groups, the content of said polyvinyl alcohol being 40 – 150% by weight based on the weight of polyvinyl chloride including the grafted polyvinyl chloride, and the content of said water-soluble amide-terpolymer being less than 20% by weight based on the weight of polyvinyl chloride including the grafted portions.

2. A polymeric composition consisting essentially of polyvinyl alcohol, polyvinyl chloride and a water-soluble amidecopolymer consisting essentially of methylolated acrylamide and sodium allylsulfonate, a part of the polyvinyl chloride being grafted on to the water-soluble amide-copolymer, said watersoluble amide-copolymer containing at least 80 mole % amido groups, the content of said polyvinyl alcohol being 40 – 150% by weight based on the weight of polyvinyl chloride including the grafted polyvinyl chloride, and the content of said water-soluble amide-copolymer being less than 20% by weight based on the weight of polyvinyl chloride including the grafted portions.

3. A polymeric composition consisting essentially of polyvinyl alcohol, polyvinyl chloride and methylolated polyacrylamide, a part of the polyvinyl chloride being grafted on to the methylolated polyacrylamide, which contains at least 80 mole % methylolated amidogroups, the content of said polyvinyl alcohol being 40 – 150% by weight based on the weight of polyvinyl chloride including the grafted polyvinyl chloride, and the content of said polyacrylamide being less than 20% by weight based on the weight of polyvinyl chloride including the grafted portions.

* * * * *